(12) United States Patent
Bauch et al.

(10) Patent No.: US 7,584,868 B2
(45) Date of Patent: Sep. 8, 2009

(54) VENDING MACHINE FOR AN AIRCRAFT

(75) Inventors: Anna Bauch, Munich (DE); Oliver Doebertin, Hamburg (DE); Alexander Niesigk, Buchholz (DE); Florian Schmidt, Ahrensburg (DE); Britta Henselmeyer, Hamm (DE)

(73) Assignee: Airbus Deutschland GmbH (DE)

( * ) Notice: Subject to any disclaimer, the term of this patent is extended or adjusted under 35 U.S.C. 154(b) by 270 days.

(21) Appl. No.: 11/165,694

(22) Filed: Jun. 23, 2005

(65) Prior Publication Data

US 2006/0016825 A1 Jan. 26, 2006

Related U.S. Application Data

(60) Provisional application No. 60/584,419, filed on Jun. 30, 2004.

(30) Foreign Application Priority Data

Jun. 30, 2004 (DE) .................. 10 2004 031 699

(51) Int. Cl.
*B65H 3/44* (2006.01)

(52) U.S. Cl. ........................................ 221/95; 221/197

(58) Field of Classification Search .................. 221/197
See application file for complete search history.

(56) References Cited

U.S. PATENT DOCUMENTS

| | | | | |
|---|---|---|---|---|
| 3,608,627 | A * | 9/1971 | Shevlin | 165/206 |
| 5,025,950 | A * | 6/1991 | Trouteaud et al. | 221/5 |
| 5,139,384 | A * | 8/1992 | Tuttobene | 221/88 |
| 5,499,707 | A | 3/1996 | Steury | 194/217 |
| 5,509,573 | A * | 4/1996 | Campoli | 221/133 |
| 5,641,092 | A * | 6/1997 | Scott | 221/134 |
| 5,647,507 | A * | 7/1997 | Kasper | 221/151 |
| 5,831,862 | A * | 11/1998 | Hetrick et al. | 700/232 |
| 6,230,930 | B1 * | 5/2001 | Sorensen et al. | 221/131 |
| 6,253,954 | B1 | 7/2001 | Yasaka | 221/93 |
| 6,286,715 | B1 * | 9/2001 | Ziesel et al. | 221/171 |
| 6,347,524 | B1 * | 2/2002 | Barrash et al. | 62/6 |
| 6,505,755 | B1 * | 1/2003 | Voss | 221/192 |

FOREIGN PATENT DOCUMENTS

| | | |
|---|---|---|
| DE | 100 17 127 A 1 | 10/2001 |
| EP | 0 258 954 A3 | 3/1988 |
| GB | 2351490 | 1/2001 |

* cited by examiner

*Primary Examiner*—Gene Crawford
*Assistant Examiner*—Timothy R Waggoner
(74) *Attorney, Agent, or Firm*—Ostrolenk Faber LLp

(57) ABSTRACT

Nowadays on commercial aircrafts, meals and beverages are usually served by the on-board personnel on trays that are transported to the respective row of seats with the aid of trolleys. The present application describes a vending machine that comprises a magazine and a selector. The magazine is adapted for accommodating or storing a plurality of products. The dispensing of a product can be triggered by actuating the selector. Such a vending machine allows each passenger to choose the respective meal or beverage, as well as the time of its consumption. In addition, the vending machine according to the invention may simplify the on-board work such that the personnel costs can be reduced.

11 Claims, 2 Drawing Sheets

VENDING MACHINE FOR AN AIRCRAFT

FIELD OF THE INVENTION

The present invention relates to the dispensing of products in an aircraft. In particular, the present invention relates to a vending machine for an aircraft, an aircraft comprising a vending machine and the utilization of a corresponding vending machine on a commercial aircraft.

TECHNOLOGICAL BACKGROUND

In modern aircrafts, the passengers are serviced by the crew only. Flight attendants deliver meals and beverages to the passengers on trays that are transported to the respective row of seats with the aid of trolleys. These meals are prepared or heated and assembled in galleys or on-board kitchens. The crew needs to begin with the service preparations immediately after take-off and deliver the heavy trolleys to the passengers, if applicable, while the aircraft is still climbing. This service concept is associated with high expenditures and a lack of flexibility for the passengers because each passenger is dependent on being served directly by a crew member.

SUMMARY OF THE INVENTION

According to an exemplary embodiment of the present invention, a vending machine for an aircraft is provided comprising a magazine and a selector. The magazine may be adapted to store, hold or accommodate a plurality of products. The dispensing of a product can be triggered by actuating the selector.

The vending machine according to the invention may allow a largely automated service of flight passengers such that the individual crew members are relieved. This means that the number of crew members may be reduced in order to achieve corresponding cost savings.

Individual products that may comprise, for example, snacks, beverages or other articles which can be removed from the magazine by actuating (or touching) the selector. This enables the passengers to obtain meals or other products on demand such that the convenience and the comfort of the passengers may be simultaneously improved. In addition, the passengers are inspired to move about the aircraft because they have to walk to the automatic vending machine. A self-service area, in which the vending machine may be installed, may also serve as a communication hub that contributes to the entertainment and distraction of the passengers.

According to another embodiment of the present invention, the vending machine comprises a dispensing area and a mechanical product transport, wherein a first product of a multitude of products can be gently transported from the magazine to the dispensing area by the product transport. The product transport may be realized, in particular, such that the products may be safely transported to the dispensing area independently of their respective position and any vibrations. This advantageously ensures a reliable operation independently of the altitude and/or turbulences.

Due to the gentle and careful transport of the products by the product transport that may comprise, for example, a portable container, the vending machine can also be loaded with products that would not survive a less careful dispensing process without damages. In other words, the vending machine according to the invention is suitable for use with a multitude of different products, for example, delicate meals or beverages in damageable containers.

According to another embodiment of the present invention, the magazine can be exchanged without essentially any appliances or tools such that new products can be loaded into the vending machine in-flight.

This ensures that products can be continuously replenished and that even unusually high passenger demands can be met. According to this embodiment of the present invention, the magazine can be easily exchanged without requiring special tools. Consequently, the on-board crew can easily replenish the respective products.

According to another embodiment of the present invention, the dimensions of the magazine correspond to the size of the first product such that the first product is prevented from falling out of the magazine. In other words, the magazine may comprise compartments which dimensions largely correspond to the dimensions of the respective product to be stored in the respective compartment. The dimensions in this respect may relate to a height, length, width or cross sectional shape of the respective compartment.

The height and the width of the magazine interior (of the whole magazine or of the respective compartment) may be adapted to the size of the first product such that the first product essentially cannot be displaced upward or sideward. Since the first product is secured toward the top and the sides, it may be ensured that the first product can only be moved in one dimension, namely forward or backward for being dispensed.

According to another exemplary embodiment of the present invention, the magazine includes a screw conveyor which is rotatably supported, wherein the first product can be transported out of the magazine by the rotating screw conveyor.

The screw conveyor represents a simple and effective means for fixing the products in the corresponding position. In this case, the screw conveyor essentially serves for fixing the products toward the front and the rear, wherein the adaptation of the dimensions of the magazine interior to the size of the products contained therein results in the products being fixed laterally and vertically. The rotating screw conveyor also serves for transporting forward and pushing the first product out of the magazine such that it can be subsequently removed from the dispensing area.

According to another embodiment of the present invention, the vending machine also contains a motor for turning the screw conveyor.

This motor may make it possible to realize an automated operation of the screw conveyor, i.e., the screw conveyor does not have to be operated manually.

According to another exemplary embodiment of the present invention, the vending machine also includes a sensor for monitoring the dispensing area. The sensor may serve, for example, for ensuring that the dispensing area is free of obstructing objects before the product is dispensed or that the product is actually removed from the dispensing area by the respective passenger.

According to another exemplary embodiment of the present invention, the selector includes a touch screen for selecting the respective product in a magazine.

For example, this may allow a simple and user-friendly selection of a product in a magazine. This screen also makes it possible to display comprehensive information, for example, on the products contained in the vending machine. A flexible and individually adjustable selection by the respective passenger can be achieved due to the design of the selector in the form of a touch screen or sensor screen.

According to another embodiment of the present invention, the vending machine comprises a payment unit, wherein the payment unit is designed for accepting a means of payment from the group consisting of credit card, value-chip, cash, disposable swipecard and boarding ticket.

This may allow that each passenger is charged an amount that corresponds to the individually selected products. Disposable swipecards that can be charged or are pre-charged with a certain amount before the flight represent a particularly flexible and effective payment means.

Also, according to another exemplary embodiment, an aircraft is provided including a passenger cabin. The passenger cabin includes an area which is arranged as self-service area and may be provided with one or more dispensing machines. Close to the vending machines, there may be seats or a bank which may allow the passengers to directly consume the purchased product. For this, the passengers may sit on the surrounding chairs or the bank.

Other objectives, embodiments and advantages of the invention are described in the following.

SHORT DESCRIPTION OF THE DRAWINGS

Exemplary embodiments of the invention are described in greater detail below with reference to the drawings.

DETAILED DESCRIPTION OF EXEMPLARY EMBODIMENTS

In the following description of the figures, identical or similar elements are identified with the same reference numbers.

Figure 1:
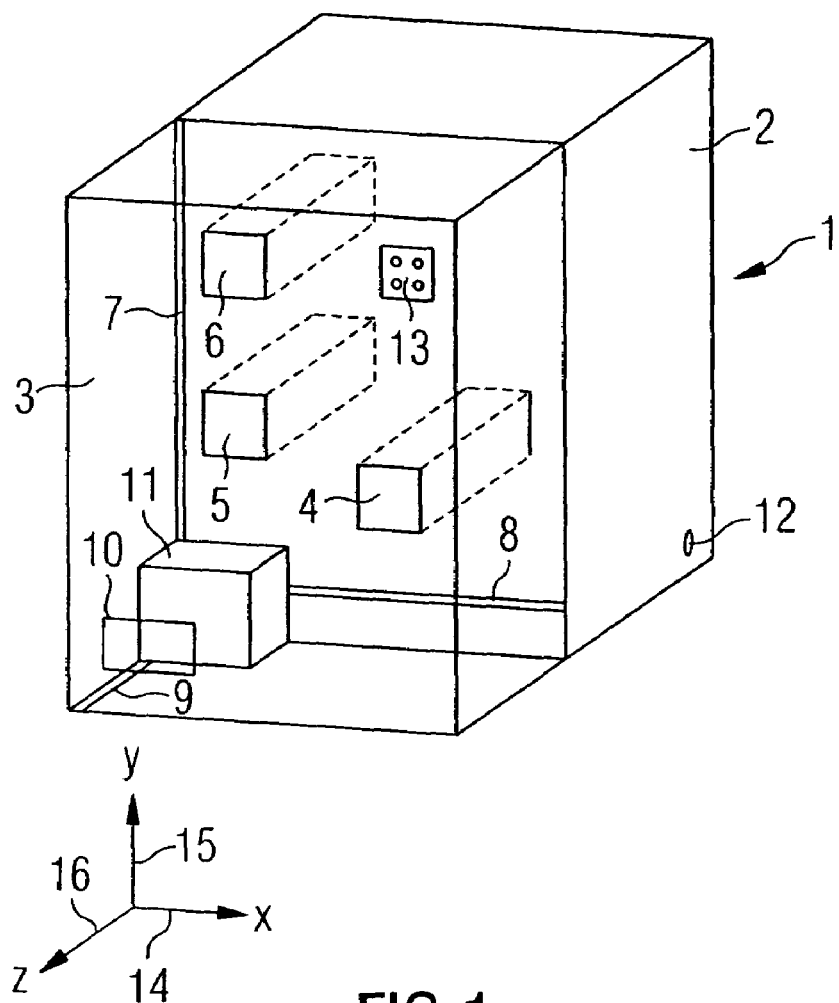
FIG. 1 shows a schematic representation of a first exemplary embodiment of a vending machine according to the present invention.

FIG. 1 shows a schematic representation of a first embodiment of a vending machine according to the present invention. According to FIG. 1, the vending machine 1 comprises a front area 3 and a rear area 2. The vending machine 1 also comprises three magazines 4, 5, 6 that can be loaded with corresponding products, as well as a selector 13, the actuation of which triggers the dispensing of a selected product. The vending machine 1 also comprises a dispensing area 10 that is integrated into the front side of the front region 3, as well as a mechanical product transport container 11 that can be moved along guide rails 7, 8, 9.

The vending machine 1 is connected to the on-board energy supply of the aircraft by means of a power supply terminal 12.

The vending machine according to the invention that is illustrated in FIG. 1 may be designed, for example, in the form of an automatic vending machine for dispensing meals and beverages in an aircraft cabin such that the work load of the on-board crew is significantly reduced. Such a self-service area according to the invention not only enables each individual passenger to choose the respective meal or beverage, but also the time of its consumption.

In conventional aircraft, the service in the economy class is limited to one to three fixed cycles depending on the length of the flight. Other meals or snacks are not served, and the meals dispensed in the respective cycles are not served on demand. According to the invention, the vending machine allows a largely automated dispensing of products such that the service personnel is relieved. In addition, foods such as, for example, snacks and beverages are freely accessible to the passengers on demand. This not only improves the convenience for the individual passengers by directly taking into account their requirements, but also reduces the workload of the crew. Consequently, it would be possible, for example, to reduce the number of crew members in dependence on the cabin design.

As mentioned above, the vending machine 1 comprises a rear area 2 that serves for accommodating or holding the different magazines 4, 5, 6. Naturally, the vending machine is not limited to the integration of three magazines 4, 5, 6. according to a variant of this embodiment, the respective magazines may be provided with one or more compartments which, as the whole magazine, may be adapted to the respective product to be stored in regards to e.g. the dimensions, the form, the material or hygienic requirements.

On the contrary, it would be conceivable to accommodate a multitude of other magazines (not shown in FIG. 1) of various shapes and sizes. The individual magazines 4, 5, 6 can be inserted into the system, for example, from the rear in order to also ensure a convenient, fast and simple loading of the vending machine 1 in-flight. This fast and simple exchange of individual magazines makes it possible to continuously replenish products, namely also products that are in unusually high demand. Depending on supply and demand, individual magazines can also be replaced with magazines containing other products.

The individual magazines can essentially be exchanged without any appliances or tools such that the vending machine 1 can also be loaded with new products in-flight by untrained personnel. For example, the customary sliding and locking system used in modern galleys may be considered for this purpose.

Naturally, it would also be conceivable to load the vending machine 1, for example, from the top or from the side.

The dimensions of the individual magazines 4, 5, 6 advantageously correspond to the size of products accommodated therein. According to one embodiment of the present invention, the dimensions of the magazines 4, 5, 6 are chosen such that the products contained therein (not shown in FIG. 1) have no degree of freedom in the X-direction and the Y-direction (indicated with arrows 14, 15). This means that the respective products can only be moved in the Z-direction 16 when a corresponding drive (not shown in FIG. 1) is actuated. The products are effectively prevented from falling out of the magazines, in particular, due to the limited dimensions of the magazines 4, 5, 6 in the X-direction and the Y-direction 14, 15.

The vending machine 1 may be integrated into the cabin, for example, instead of a limited galley area or installed in the form of a supplement to conventional galleys. The thusly created self-service area also has the character of a communication hub or "social point," in which passengers meet and converse. This decisively contributes to the comfort and the relaxation of the passengers.

In addition to the magazines 4, 5, 6 with specially adapted dimensions, the system comprises a mechanical product transport 11 that also remains fully functional while the aircraft is banking or subjected to turbulence. The products are arranged behind one another in the magazines 4, 5, 6 with the aid of screws (not shown in FIG. 1). For example, the corresponding screw is rotatably supported in the rear wall of the magazine and its end is connected to a motor (not shown in FIG. 1) arranged in the automatic vending machine. The screw conveyor can be set in rotation by the motor such that the turning screw conveyor transports the products out of the respective magazines 4, 5, 6.

The products are prevented from falling out of the magazine in case the aircraft encounters turbulence due to the adaptation of the respective magazine dimensions to the product contained therein. The mechanical product transport container 11 is coupled to and can be displaced along guide rails 7, 8, 9. In this respect, Various drives and mechanisms may be considered, for example, chain drives or pinion drives. These mechanisms as well as the corresponding guide rails are well known from the state of the art and consequently not described in greater detail.

The "elevator principle" according to the invention allows a very careful transport of the products and consequently is also suitable for use, in particular, with fruits as well as sandwiches, salads or the like.

The front area 3 of the vending machine 1 also contains a dispensing area 10. The products from the magazines 4, 5, 6 received by the product transport container 11 can be gently transported to the dispensing area 10 by the product transport container 11. In this case, the dispensing area 10 is realized, for example, in the form of a flap integrated into the front plate of the front area 3. For example, the flap has a smaller circumference than the product transport container 11 such that the user can only reach into the product transport container 11. The dispensing area 10 is also provided with a corresponding locking mechanism (not shown in FIG. 1) that can be triggered, for example, electronically when the mechanical product transport container 11 is situated in the dispensing area 10.

Naturally, it would also be conceivable for the mechanical product transport container 11 to mechanically actuate the unlocking mechanism and push aside the flap 10 during its movement in the direction of the dispensing area 10 such that the respective passenger can subsequently reach into the product transport container 11 in order to remove the selected product.

Figure 2:
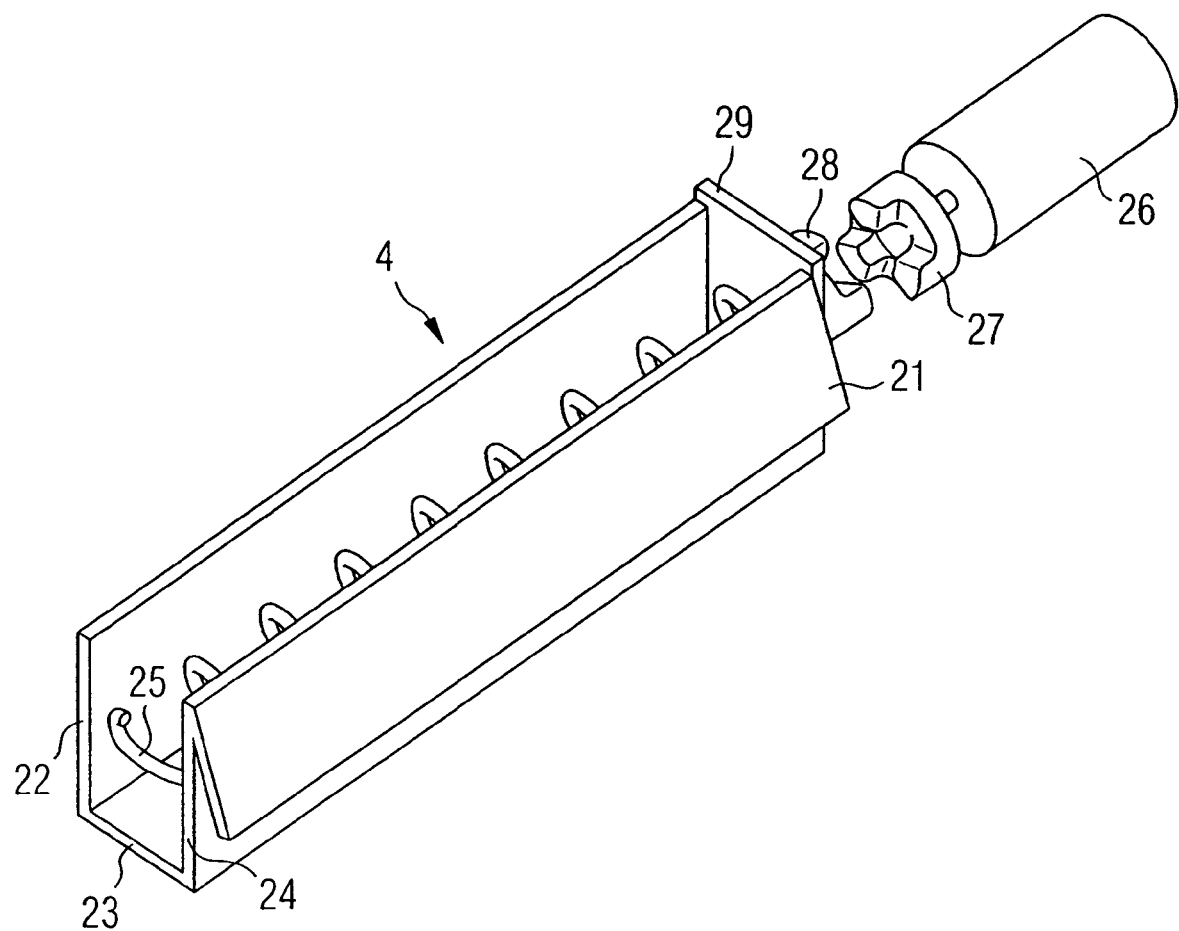
FIG. 2 shows a schematic representation of a magazine with a corresponding motor for a vending machine according to FIG. 1.

FIG. 2 shows a schematic representation of a magazine for a vending machine according to FIG. 1, as well as a corresponding motor. According to FIG. 2, the magazine 4 has a housing that includes of side plates 22, 24, a bottom plate 23 and a rear plate 29. The magazine 4 also comprises a cover plate 21 that is supported on hinges (not shown in FIG. 2) and can be opened in order to load the magazine 4. The cover plate 21 is then closed and the magazine can be inserted into the rear area 2 of the vending machine 1 shown in FIG. 1. The magazine 4 also contains a screw conveyor 25 that is rotatably supported in the rear plate 29. The corresponding products are accommodated between the turns of the screw conveyor 25 and can be displaced in the Z-direction (see reference symbol 16 in FIG. 1) along the longitudinal axis of the screw conveyor once it is set in rotation.

The products may not only comprise food such as, for example, snacks or beverages, but also many other products, for example, toys, cosmetics, luxury articles or other consumer goods.

After the passenger selects and pays for the desired product with the aid of the selector (reference symbol 13 in FIG. 1), the mechanical product transport (reference symbol 11 in FIG. 1) moves in front of the respective magazine containing the selected product. Subsequently, the screw 25 of this magazine 4 is turned until the product drops into the product transport 11. For example, the rotation of the screw 25 is realized with the aid of a motor 26 that is arranged, for example, in the rear wall of the rear area 2 of the vending machine 1 (see FIG. 1).

The motor 26 may comprise, for example, an electric motor that is electronically controlled via corresponding data lines. The shaft of the motor 26 is provided, for example, with a coupling mechanism 27 that engages into a corresponding counterpart 28 arranged on the end of the screw 25.

The motor 26 may be arranged, for example, in a segment of the rear wall of the rear area 2 of the vending machine 1 that can be opened by means of a corresponding hinge arrangement. The opening of the rear wall causes the shaft of the motor 26 to separate from the screw conveyor 25 such that the magazine 4 can be removed from the vending machine. After the rear wall is closed again, the motor 26 is reconnected to the screw conveyor 25 and able to drive the screw 25.

Naturally, the automatic vending machine could also be realized in such a way that the screw conveyor is operated manually by the user after the corresponding magazine 4 is selected, the user pays for the product and the automatic vending machine is electronically released.

After the product drops from the magazine 4 into the product transport 11, the product transport 11 moves toward the dispensing area 10 along the rails 7, 8, 9 as indicated in FIG. 1. The user is now able to remove the selected product. Subsequently, the product transport moves to a neutral position and the vending machine is ready for the next customer.

Figure 3:
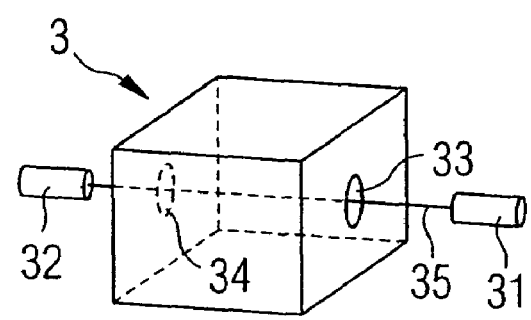
FIG. 3 shows a schematic representation of the dispensing area of a vending machine according to FIG. 1.

FIG. 3 shows a schematic representation of a dispensing area 3 for a vending machine according to FIG. 1. FIG. 3 shows that the dispensing area 3 has a container-shaped structure with recesses 33, 34 in its lateral surfaces. Sensors 31, 32 positioned in front of the dispensing area check if any objects such as, for example, the hands of a user are situated in the dispensing area. The sensors 31, 32 could also check whether or not the desired product was removed.

The sensors 31, 32 are realized, for example, in the form of light sensors or Hall sensors. It would also be conceivable to utilize a variety of other sensors, for example, mechanical sensors or cameras. The corresponding sensors could also be arranged at various locations other than those shown in FIG. 3.

The vending machine 1 is operated with the selector 13 according to FIG. 1 which comprises, for example, a touch screen and enables the user to select the desired product. Payment is rendered, for example, by means of a disposable swipecard, a credit card, a value-chip, cash or the boarding ticket. The respective means of payment can be inserted into a payment unit that is integrated, for example, into the selector 13.

According to the invention, the vending machine supplements or even replaces segments of the on-board service. Passengers are able to obtain snacks and beverages at all times. Due to the reduced work load, it is estimated that the crew can be reduced by one and costs can be lowered accordingly. The self-service vending machine enables the passengers to obtain meals "on demand" such that the convenience and comfort of the passengers is improved. The risk of a thrombosis a simultaneously reduced because the passengers are forced to walk to the automatic vending machine. In addition, a communication hub is created around the self-service area, wherein airlines can distinguish themselves from competitors with an automatic vending machine and utilize the positive aspects for marketing purposes.

The realization of the invention is not limited to the preferred embodiment illustrated in the figures. On the contrary, it would be conceivable to realize numerous variations that utilize the described solution and the principle of the invention in embodiments with a basically different design.

In summation, it should be understood that the term "comprising" does not preclude any other elements or steps, and that the terms "one" or "a" do not preclude a plurality. It should also be understood that characteristics or steps that were disclosed in connection with one of the above-described embodiments could also be utilized in combination with other characteristics or steps disclosed in connection with other above-described embodiments. The reference symbols used in the claims should not be understood in a restrictive sense.

We claim:

1. A vending machine for an aircraft for dispensing a first product of a plurality of products, comprising:
    a magazine configured to accommodate the plurality of products, the products having at least two dimensions, the magazine having an outlet opening, a height and a width, the height and the width of the magazine corresponding to the two dimensions of the products, respectively, such that the products accommodated within the magazine have no degree of freedom of movement in a direction of the height or in a direction of the width of the magazine and having a degree of freedom of movement only in a longitudinal direction of the magazine, the magazine further having a top cover plate and at least one hinge connecting the top cover plate to the magazine, the top cover plate being closed when the magazine is inserted into the vending machine and the top cover plate being operable to be opened for loading the magazine;
    a dispensing area at a distance from the magazine;
    a movable mechanical product transport container operable to receive a first one of the products from the outlet opening of the magazine and configured to securely transport the first product inside the product transport container from the magazine to the dispensing area regardless of a first product's initial position in the magazine and notwithstanding vibrations of the machine or turbulence of the aircraft;
    a plurality of guide devices positioned in the vending machine configured to enable motion of the mechanical product transport container in at least one of an up-down direction, a side-to-side direction and a front-to-back direction, the mechanical product transport container being operable to be guided by the guide devices to move in at least one of the up-down direction, the side-to-side direction and the front-to-back direction, the guide devices being rails along which the product transport container is movable, the rails respectively extending in the up-down, side-to-side and front-to-back directions; and
    a selector for selecting the first product of the plurality of products, wherein the selector is operable such that actuation of the selector triggers exit of the first product from the outlet opening of the magazine and into the product transporting container and subsequent dispensing of the first product at the dispensing area.

2. The vending machine of claim 1,
    wherein the magazine is exchangeable for another of the magazine without any additional appliances such that the vending machine can be loaded with new products in-flight.

3. The vending machine of claim 1,
    wherein dimensions of the magazine correspond to a size of the first product such that the first product is prevented from falling out of the magazine.

4. The vending machine of claim 1,
    wherein the magazine includes a screw conveyor rotatably supported within the magazine, the screw conveyor being rotatable to advance the first product from its initial position to the outlet opening of the magazine and into the product transport container.

5. The vending machine of claim 4, further comprising:
    a motor connected to the screw conveyor for rotating the screw conveyor.

6. The vending machine of claim 1, further comprising:
    a sensor operable for monitoring the dispensing area and for determining whether the first product is situated in the dispensing area.

7. The vending machine of claim 1,
    wherein the selector comprises a touch screen having a surface with touch regions, and the touch screen is operable such that the first product in the magazine is selectable by touching a corresponding region on the surface of the touch screen which then corresponds to the first product.

8. The vending machine of claim 1, further comprising:
    a payment unit operable to accept a means of payment from the group consisting of a disposable swipecard, a credit card, a value chip, cash and a boarding ticket and the payment unit is operable to cause operation of the selector and movement of the container.

9. An aircraft comprising the vending machine of claim 1.

10. An aircraft, comprising:
    a self-service area configured for accommodating the vending machine of claim 1.

11. A method comprising a step of using the vending machine of claim 1 in an aircraft.

* * * * *